United States Patent
Kojima et al.

(10) Patent No.: US 7,903,912 B2
(45) Date of Patent: *Mar. 8, 2011

(54) OPTICAL CONNECTOR

(75) Inventors: Seiji Kojima, Hitachi (JP); Kanako Suzuki, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/382,114

(22) Filed: Mar. 9, 2009

(65) Prior Publication Data

US 2010/0086265 A1 Apr. 8, 2010

(30) Foreign Application Priority Data

Mar. 10, 2008 (JP) .................................. 2008-059948
Mar. 10, 2008 (JP) .................................. 2008-059949

(51) Int. Cl.
- G02B 6/26 (2006.01)
- G02B 6/38 (2006.01)
- G02B 6/36 (2006.01)
- G02B 6/255 (2006.01)

(52) U.S. Cl. ................. 385/38; 385/66; 385/67; 385/69; 385/91; 385/98; 65/406; 65/407

(58) Field of Classification Search .................... 385/38, 385/66, 67, 69, 91, 98; 65/406, 407

See application file for complete search history.

(56) References Cited

U.S. PATENT DOCUMENTS

| | | | |
|---|---|---|---|
| 4,444,453 A * | 4/1984 | Kirby et al. ................... | 439/583 |
| 4,460,820 A * | 7/1984 | Matsumoto et al. .......... | 219/385 |
| 4,544,234 A * | 10/1985 | DeVeau et al. .................. | 385/98 |
| 4,940,307 A * | 7/1990 | Aberson et al. ................. | 385/98 |
| 5,018,821 A * | 5/1991 | Kurata ............................ | 385/72 |
| 5,061,034 A * | 10/1991 | Fujikawa et al. ............... | 385/95 |
| 5,891,210 A * | 4/1999 | Watanabe et al. .............. | 65/406 |
| 6,242,699 B1 * | 6/2001 | Greiner et al. ............. | 174/75 C |
| 2002/0106164 A1 | 8/2002 | Sasaoka et al. | |
| 2002/0159734 A1 | 10/2002 | Sasaoka et al. | |

FOREIGN PATENT DOCUMENTS

| JP | 2002-236234 | 8/2002 |
|---|---|---|
| JP | 2002-323625 | 11/2002 |

* cited by examiner

*Primary Examiner* — Uyen-Chau N Le
*Assistant Examiner* — Chris H Chu
(74) *Attorney, Agent, or Firm* — McGinn IP Law Group, PLLC

(57) ABSTRACT

In an embodiment of the invention, an optical connector for optically coupling respective end faces of two optical fiber cables including an optical fiber composed of a core and a cladding includes a beat shrinkable tube, a cable insertion tube disposed in the heat shrinkable tube for inserting thereinto and butting the respective end faces of the two optical fiber cables, an uncured refractive index matching resin disposed between the beat shrinkable tube and the cable insertion tube, and a resin supply hole formed in the cable insertion tube for supplying the uncured refractive index matching resin to an inside of the cable insertion tube. In an alternative embodiment, an optical connector includes a protection sleeve, a cable insertion tube disposed in the protection sleeve for inserting thereinto and butting the respective end faces of the two optical fiber cables, an optical instantaneous adhesive material disposed between the protection sleeve and the cable insertion tube, and an adhesive material supply hole formed in the cable insertion tube for supplying the optical instantaneous adhesive material to an inside of the cable insertion tube.

11 Claims, 3 Drawing Sheets

101 OPTICAL CONNECTOR

FIG.5B 31a, 31b OPTICAL FIBER CABLE
104 ADHESIVE MATERIAL SUPPLY HOLE
105 ADHESIVE MATERIAL BAG

FIG.6A

21 CONNECTION PART
102 PROTECTION SLEEVE
3 CABLE INSERTION TUBE

OPTICAL CONNECTOR

The present application is based on Japanese patent application Nos. 2008-059948 and 2008-059949 filed Mar. 10, 2008, the entire contents of which are incorporated herein by reference.

BACKGROUND OF THE INVENTION

1. Field of the Invention

This invention relates to an optical connector for connecting each other two optical fibers composed of a core and a cladding.

2. Description of the Related Art

In general, for connecting two optical fibers, a physical connection method is used in which the optical fibers or ferules with the optical fiber inserted thereinto are butted each other. For example, mechanical splice, SC optical connector, FC optical connector, MT optical connector can be used in the method.

A method for connecting two optical fibers is proposed in which a covering of an optical fiber cable is removed at its end, the exposed optical fiber is cleaned and cut by using a specialized fiber cutter, the optical fiber cores are connected by using a specialized fusion connector, and the fusion connection portion is protectively covered with a protection sleeve.

The related prior arts to the invention are, e.g., JP-A-2002-236234 and JP-A-2002-323625.

However, all of the conventional connection methods need, prior to connecting the optical fiber cores, many steps or specialized tools for removal of the covering of the optical fiber cable, and cleaning, cutting, polishing etc. of the optical fiber. Thus, the conventional methods require a good deal of time, cost and steps, and they are difficult connection technique for everyone except workers skilled in optical techniques.

SUMMARY OF THE INVENTION

It is an object of the invention to provide an optical connector that allows easy handling of optical fibers in connection work such that every worker can easily conduct the connection work.

(1) According to one embodiment of the invention, an optical connector for optically coupling respective end faces of two optical fiber cables comprising an optical fiber comprising a core and a cladding comprises:

a heat shrinkable tube;

a cable insertion tube disposed in the beat shrinkable tube for inserting thereinto and butting the respective end faces of the two optical fiber cables;

an uncured refractive index matching resin disposed between the heat shrinkable tube and the cable insertion tube; and a resin supply hole formed in the cable insertion tube for supplying the uncured refractive index matching resin to an inside of the cable insertion tube.

In the above embodiment (1), the following modifications, changes and a combination thereof can be made.

(i) The optical connector further comprises a resin bag with the uncured refractive index matching resin filled therein or a resin tube formed of the uncured refractive index matching resin.

(ii) The cable insertion tube is formed tapered such that it has a large diameter at both ends thereof for inserting the optical fiber cables, and a small diameter at a central region according to an outside diameter of the optical fiber cables.

(iii) The cable insertion tube comprises a metal tube or a glass tube.

(iv) The refractive index matching resin has nearly a same refractive index as the core after curing.

(v) The refractive index matching resin comprises a heat curable resin or a ultraviolet curable resin.

(2) According to another embodiment of the invention, an optical connector for optically coupling respective end faces of two optical fiber cables comprising an optical fiber comprising a core and a cladding comprises:

a protection sleeve;

a cable insertion tube disposed in the protection sleeve for inserting thereinto and butting the respective end faces of the two optical fiber cables;

an optical instantaneous adhesive material disposed between the protection sleeve and the cable insertion tube; and an adhesive material supply hole formed in the cable insertion tube for supplying the optical instantaneous adhesive material to an inside of the cable insertion tube.

In the above embodiment (2), the following modifications, changes and a combination thereof can be made.

(vi) The optical connector further comprises an adhesive material bag with the optical instantaneous adhesive material filled therein.

(vii) The cable insertion tube is formed tapered such that it has a large diameter at both ends thereof for inserting the optical fiber cables, and a small diameter at a central region according to an outside diameter of the optical fiber cables.

(viii) The cable insertion tube comprises a metal tube or a glass tube.

(ix) The optical instantaneous adhesive material has nearly a same refractive index as the core after curing.

(x) The optical instantaneous adhesive material comprises cyanoacrylate room-temperature curing instantaneous adhesives, light curing instantaneous adhesives, or one or two-component epoxy resin room-temperature curing instantaneous adhesives.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First embodiment

The first preferred embodiment of the invention will be explained below referring to the drawings.

Figure 3:
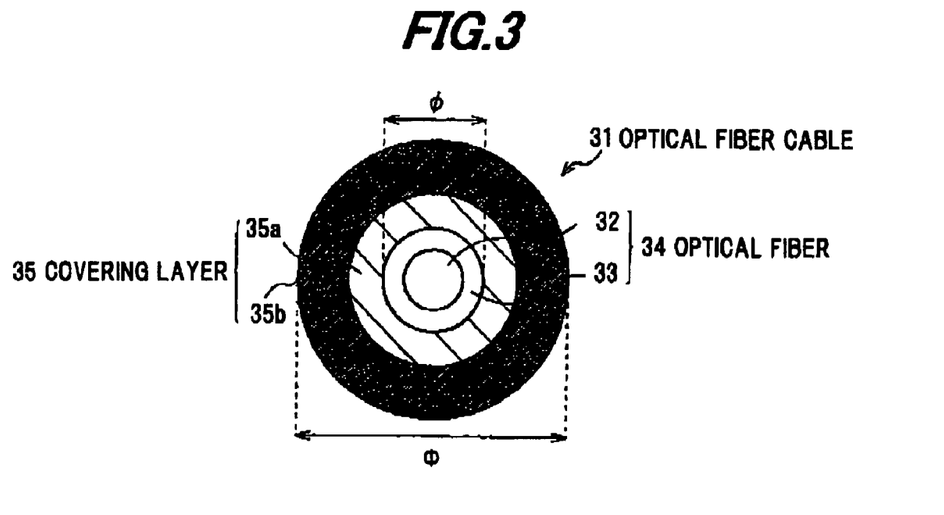
FIG. 3 is a cross sectional view showing an example of an optical fiber cable to be connected by the optical connector in FIG. 1A.

FIG. 3 is a cross sectional view showing an example of an optical fiber cable to be connected by an optical connector in the embodiments of the invention.

As shown in FIG. 3, an optical fiber cable 31 is constructed of an optical fiber (or optical fiber core) 34 composed of a core 32 and a cladding 33 covering the periphery of the core 32, and a covering layer 35 covering the periphery of the optical fiber 34. In this embodiment, as the optical fiber 34, a single-mode optical fiber is used that is generally in wide use, mainly formed of silica glass, and 125 μm in outside diameter φ. The core 32 is about 1.463 in refractive index by adding a refractive index adjuster such as Ge into pure silica. The cladding 33 is formed of pure silica and 1.458 in refractive index.

The covering layer 35 is composed of an inner covering layer (or primary layer) 35a as a buffer layer, and an outer covering layer (or secondary layer) 35b as a protection sheath. In this embodiment, the inner covering layer 35a and the outer covering layer 35b are formed of ultraviolet (UV) curable resin, and the optical fiber cable 31 is 250 μm in outside diameter Φ.

Figures 1A, 1B:
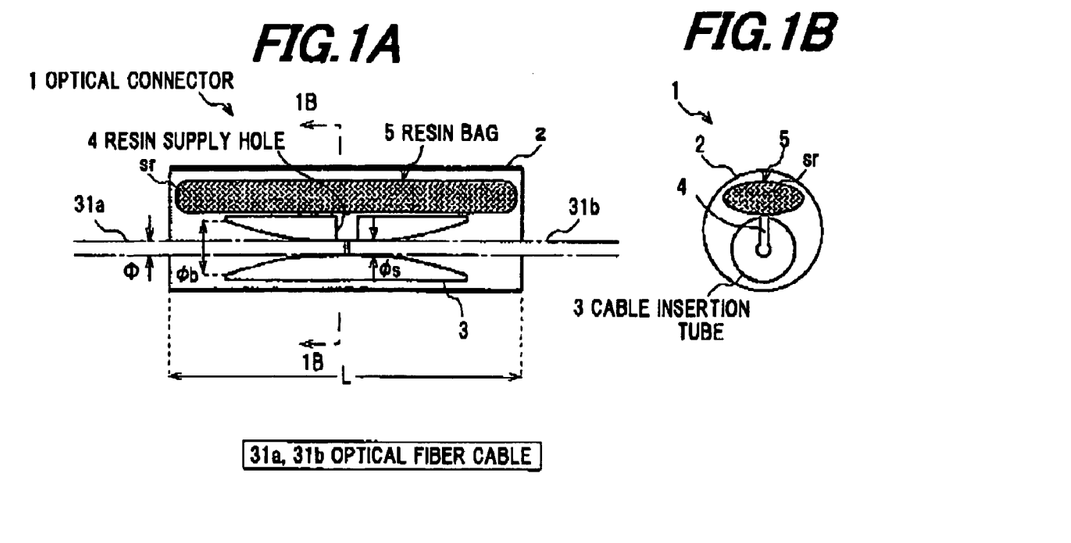
FIG. 1A is a cross sectional view showing an optical connector in a first preferred embodiment according to the invention.
FIG. 1B is a cross sectional view cut along a line 1B-1B in FIG. 1A.

FIG. 1A is a cross sectional view showing an optical connector in the first embodiment of the invention. FIG. 1B is a cross sectional view cut along a line 1B-1B in FIG. 1A.

As shown in FIGS. 1A and 1B, the optical connector 1 of the embodiment is constructed of heat shrinkable tube (or thermal protection sleeve) 2, a cable insertion tube 3 for butting optical fiber cables 31a and 31b therein by inserting end faces, which are formed only by cutting, of the optical fiber cables 31a and 31b or end faces thereof (without being polished) formed by removing the covering layer 35 at the end of the optical fiber cables 31a and 31b, then cleaning the optical fiber cores and cutting them by an ordinary tool such as scissors or nipper (without using a special tool such as a fiber cutter), and an uncured refractive index matching resin 'sr' provided in the heat shrinkable tube 2.

The end faces formed only by cutting of the optical fiber cables 31a and 31b mean those that are formed by directly cutting the end of the optical fiber cables 31a, 31b to be connected by using the ordinary tool such as scissors or nipper without removing the covering layer 35 as shown in FIG. 3. The end faces are not polished.

The cable insertion tube 3 is a hard tubular member which has a typical cylindrical shape in appearance. The inside wall is formed tapered such that a large diameter φ b is provided at both ends of the tube for inserting the optical fiber cables 31a, 31b and a small diameter φ s (φb>φs) is provided at the central part of the tube for suiting the outside diameter Φ of the optical fiber cables 31a, 31b. In this embodiment, the small diameter φ s is rendered a little larger than 250 μm such that the small diameter φ s is slightly larger than the outside diameter Φ.

The cable insertion tube 3 is formed with a metal tube of a metal such as SUS (i.e., stainless steel), Al and Cu with relatively high strength and high thermal conductivity or formed with a glass tube of industrial-glass, silica glass etc. In this embodiment, a SUS tube is used that is balanced on the aspect of high strength, high thermal conductivity, low cost and availability.

The cable insertion tube 3 is provided with at least one resin supply hole 4 that penetrates radially from a periphery at a central part in the longitudinal direction to an inner wall of the tube for supplying the uncured refractive index matching resin 'sr' to the central part of the cable insertion tube 3. In this embodiment, one resin supply hole 4 is formed on the side of the refractive index matching resin 'sr' disposed at the central part of the cable insertion tube 3 such that it has a width (in the longitudinal direction of the tube) longer than the distance Lj of a gap defined between the uneven end faces of the optical fiber cables 31a, 31b. A resin bag 5 with a length a little smaller than the length L of the heat shrinkable tube 2 is disposed covering the upper end of the resin supply hole 4.

The cable insertion tube 3 needs to be accurately shaped since the outer diameter Φ of the optical fiber cables 31a, 31b is very small. Therefore, the cable insertion tube 3 may be formed into a desired shape by shaping a tubular material by cutting work or electrical discharge machining.

The uncured refractive index matching resin 'sr' is a liquid or jelly resin at room temperature. It normally has a network structure and is hardened by heating or irradiating ultraviolet rays such that the reaction occurs at unreacted until then to further reinforce the network.

The uncured refractive index matching resin 'sr' is filled in the resin bag 5 formed of a thin balloon etc. and the resin bag 5 is enclosed in the heat shrinkable tube 2. After curing, the uncured refractive index matching resin 'sr' can have a refractive index 'nr' (with n=about 1.463 in this embodiment) that is the same as the core 32 in FIG. 3.

The uncured refractive index matching resin 'sr' is preferably a heat curable resin or UV curable resin. In this embodiment, a heat curable resin is used as the uncured refractive index matching resin 'sr'. Of heat curable resins with the same after-curing refractive index as the core 32 in FIG. 3, a desired one has a visible light transmittance of 99% or more and can be adjusted in refractive index by additives. For example, "ADEKA nanohybridsilicone (FX-T350)" from ADEKA Corporation is available.

Of UV curable resins with the same after-curing refractive index as the core 32 in FIG. 3, a desired one can be adjusted in refractive index by additives. For example, "ADEKA nanohybridsilicone (FX-V550)" from ADEKA Corporation is available.

The length L of the optical connector 1 (or the heat shrinkable tube 2) is rendered 2 to 10 cm, preferably 3 to 8 cm, more preferably 3 to 6 cm in consideration of the strength of the connection part of the optical fiber cable or the downsizing of the optical connector. The cable insertion tube 3 is preferably shorter than the length L of the heat shrinkable tube 2.

A method for connecting the optical fiber cables 31a, 31b each other by using the optical connector 1 will be explained below.

First, as shown in FIGS. 1A and 1B, the optical connector 1 is provided. Then, the end of the two optical fiber cables 31a, 31b to be connected is cut by the ordinary cutter such that the core, the cladding and the covering layer are cut together, or the covering layer 35 at the end of the cables is removed and cleaned and the exposed core and the cladding are cut by the ordinary tool such as scissors or nipper.

Then, the end faces of the optical fiber cables 31a, 31b formed by cutting as above are each inserted into both sides of the cable insertion tube 3 in the heat shrinkable tube 2 and butted at the central part of the cable insertion tube 3. When the end faces of the optical fiber cables 31a, 31b are butted each other, the butting distance (i.e., the gap between the end faces of the optical fiber cables 31a, 31b) Lj is tens of micrometers at a maximum.

Figure 2A:
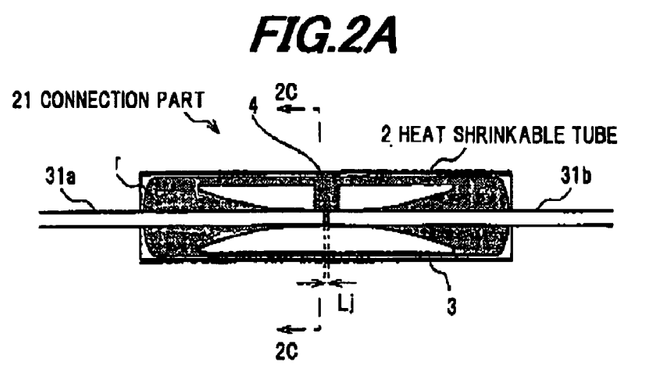
FIG. 2A is a cross sectional view showing an optical connector (connection part of optical fiber cores) with optical fiber cores connected each other therein.
Figure 2B:
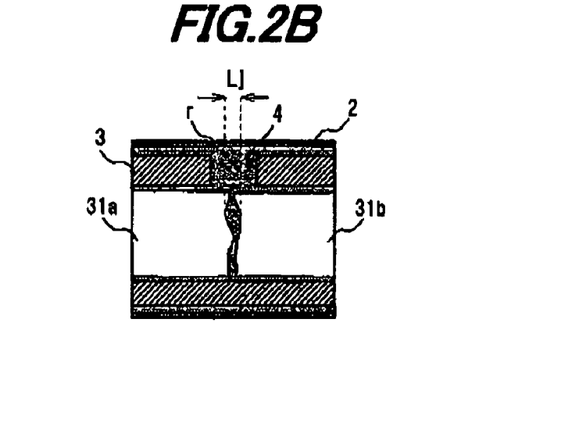
FIG. 2B is an enlarged cross sectional view showing a central part of the optical connector in FIG. 2A.
Figure 2C:
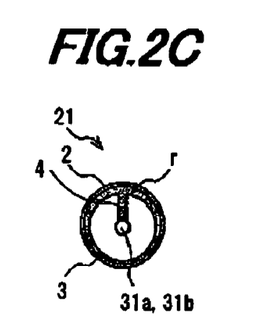
FIG. 2C is a cross sectional view cut along a line 2C-2C in FIG. 2A.

Then, the heat shrinkable tube 2 is wholly heated by using a heating device such as a handy hot plate, a dryer and a soldering iron to shrink the heat shrinkable tube 2. At this moment, as shown in FIGS. 2A to 2C, the resin bag 5 is broken or split due to the contraction force of the heat shrinkable tube 2, so that the uncured refractive index matching resin 'sr' in the resin bag 5 penetrates through the resin supply hole 4 of the cable insertion tube 3 into the inside of the cable insertion tube 3 to fill the gap between the end faces of the optical fiber cables 31a, 31b as well as the resin supply hole 4. Finally, almost all of the inside spaces of the shrunk heat shrinkable tube 2 are filled with the uncured refractive index matching resin 'sr'.

According as the heat shrinkable tube 2 is shrunk, the uncured refractive index matching resin 'sr' is gradually cured. When the uncured refractive index matching resin 'sr' is all cured, it forms a refractive index matching resin 'r' with the same refractive index as the core 32 in FIG. 3. Thereby, a connection part 21 of the optical fiber cables 31a, 31b can be obtained in which the refractive index matching resin 'r' and the cores of the optical fiber cables 31a, 31b are matched (or optically coupled) and fixed to each other.

Effects of the First Embodiment

The effects of the first embodiment will be described below.

The optical connector 1 is formed such that the cable insertion tube 3 is disposed within the heat shrinkable tube 2, the cable insertion tube 3 is provided with the resin supply hole 4 formed therein, and the uncured refractive index matching resin 'sr' is disposed in the heat shrinkable tube 2. Thus, it can be formed in simple composition and the number of components thereof can be reduced.

The connecting method of the two optical fiber cables 31a, 31b by using the optical connector 1 can be simply conducted such that the end of the cables is cut by the ordinary cutting tool such as scissors, the cut end faces are inserted into the cable insertion tube 3 and butted therein, and the connector 1 is heated by the simple heating device such as a handy hot plate.

Thereby, the uncured refractive index matching resin 'sr' is naturally flown out from the split resin bag 5 or the uncured refractive index matching resin 'sr' is melted and flown out by heating. The uncured refractive index matching resin 'sr' penetrates through the resin supply hole 4 into the butting part and is then cured. Thus, the end faces of the optical fiber cables 31a, 31b can be easily optically coupled and connected each other.

In other words, the optical connector 1 does not need the fiber cutting by the fiber cutter and the end face polishing at the connection part of the optical fiber cables 31a, 31b. Everyone can easy connect the optical fibers 34 as if done in electrical cable connection. Therefore, the optical connector 1 can be also called a simple optical connector.

In the optical connector 1, the resin bag 5 with the uncured refractive index matching resin 'sr' filled therein is enclosed in the heat shrinkable tube 2. Therefore, the optical fiber cables 31a, 31b can be connected each other only by shrinking the heat shrinkable tube 2.

The cable insertion tube 3 is formed tapered such that the large diameter is provided at both ends of the tube and the small diameter is provided at the central part of the tube for suiting the outside diameter Φ of the optical fiber cables 31a, 31b. Therefore, the optical fiber cables 31a, 31b can be easy inserted into the cable insertion tube 3 of the optical connector 1.

The cable insertion tube 3 can also serve as a support body for the connector itself and for the connection part 21 of the optical fiber cables. Therefore, the optical connector 1 and the connection part 21 of the optical fiber cables can be prevented from folding or bending so that the strength of the optical connector 1 can be enhanced.

The refractive index matching resin 'sr' used in the optical connector 1 can have the same refractive index as the core 32 after curing. Therefore, even when the fiber cut surface is roughened (See FIG. 2B) as the optical fiber cables 31a, 31b are cut by the ordinary tool, the after-curing refractive index matching resin 'r' and the cores of the optical fiber cables 31a, 31b can be matched in refractive index. Namely, the after-curing refractive index matching resin 'r' can serve as both a refractive index adjuster and an adhesive.

In the above embodiment, the resin bag 5 is exemplarily enclosed in the heat shrinkable tube 2. Alternatively, a resin tube formed of the uncured refractive index matching resin 'sr' may be enclosed in the heat shrinkable tube 2 such that the uncured refractive index matching resin 'sr' is provided in the heat shrinkable tube 2.

The optical fiber cable 31 as shown in FIG. 3 allows the internal optical fiber 34 to be broken as well as allowing the external covering layer 35 to be broken (or cut away) by bending. Thus, regardless of the existence of the covering layer 35, the optical fiber with the covering layer can be broken (cut away) by folding by hand.

Thus, the optical connector 1 can be also used such that the end faces of the optical fiber cables 31a, 31b formed by breaking (or cutting) by hand can be butted and connected each other in the cable insertion tube 3.

Optionally, plural protrusions for sticking the resin bag 5 according to the contraction of the heat shrinkable tube 2 may be provided on the periphery of the cable insertion tube 3 and in the proximity of the resin supply hole 4.

In the above embodiment, the uncured refractive index matching resin 'sr' filled in the resin bag 5 is in an amount to fill almost all of the spaces (or gaps) in the heat shrinkable tube 2 after curing. However, it may be in an amount a little exceeding almost all of the spaces (or gaps) in the heat shrinkable tube 2 after curing. In this case, the excessive refractive index matching resin 'r' is flown out from both ends of the heat shrinkable tube 2 after curing and hardened such that the optical fiber cables 31a, 31b can be firmly bonded to the heat shrinkable tube 2 after curing. Thereby, the strength of the connection part of the optical fiber cable can be also enhanced.

In the above embodiment, the optical fiber cable 31 uses the covering layer 35 with the two layer structure. However, the optical fiber cable 31 may use a cover layer with a single structure formed of, e.g., a UV curable resin.

The optical fiber composing the optical fiber cable may be a multi-mode optical fiber when the transmission speed is 10 Gbit/s or less or the total length of the optical fiber is 500 m or less.

Example

Figure 4A:
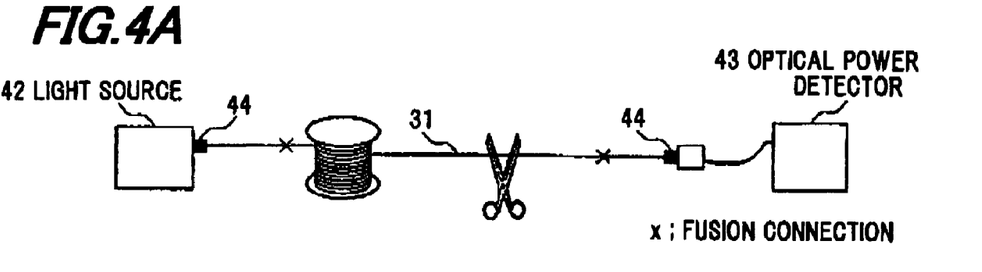
FIGS. 4A and 4B are diagrams illustrating a connection loss evaluation test conducted at the connection part of the optical fiber cores upon using the optical connector in FIG. 1A.
Figure 4B:
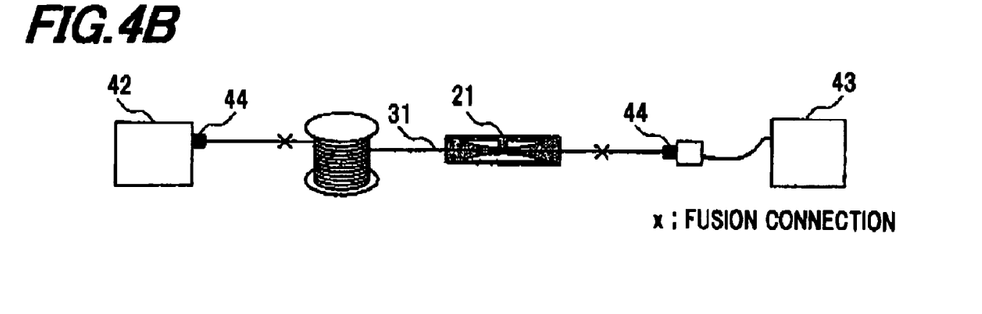

In the connection loss evaluation test system as shown in FIGS. 4A and 4B, the covering layer 35 of the optical fiber cable 31 at a part for butting connection ends is removed and cleaned. Then, the exposed optical fiber is cut at the part by scissors (FIG. 4A) and the optical fiber cables 31, 31 are connected each other by the optical connector 1 as shown in FIG. 1A to provide the connection part 21 of the optical fiber cables (FIG. 4B). Table 1 shows connection losses in this connection. The fiber connection via the connection part 21 as above is repeated five times where the optical fiber 34 is cut always by the scissors.

The optical fiber 34 is an ordinary SMF (single-mode optical fiber), a light source 42 is a stabilized light source LD-MG923A from Anritsu Corporation with a wavelength of 1.55 µm, and an optical power detector 43 is a power meter AQ2140 from Ando Electric Co., Ltd. An SMF (with a length of 4000 m) (not shown) with FC connectors 44 attached at both ends thereof is directly connected between the light source 42 and the optical power detector 43 as a reference for the connection loss evaluation.

TABLE 1

| Number of connection | Connection loss (dB) |
| --- | --- |
| 1 | 0.24 |
| 2 | 0.10 |
| 3 | 0.29 |
| 4 | 0.14 |
| 5 | 0.25 |
| Average | 0.20 |

As shown in Table 1, the connection loss is measured 0.10 to 0.29 dB and the average is 0.20 dB. When temperature is changed between −40° C. and 85° C., the connection loss and the return loss are each nearly constant.

As described, where the optical fiber 34 is cut by scissors and the respective end faces of the two optical fibers 34, 34 are connected each other via the connection part 21 of the optical fiber cables, the connection loss does not matter on the aspect of practical use. It will be appreciated that the refractive index matching resin used for the optical connector only has to have the same refractive index as the core after curing.

In addition, even when the covering layer 35 is not removed, i.e., even when the end faces of the optical fiber cables 31a, 31b formed only by cutting are butt-connected in the cable insertion tube 3, the same results are obtained in the evaluation test as described above.

Second Embodiment

The second preferred embodiment of the invention will be explained below referring to the drawings.

Figure 5A:
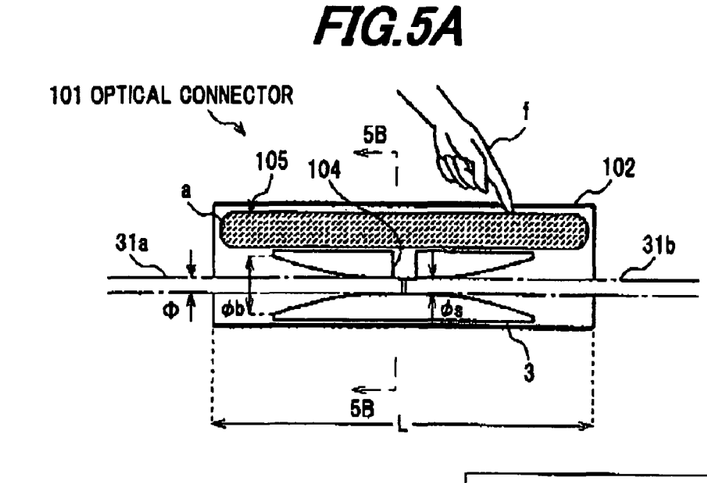
FIG. 5A is a cross sectional view showing an optical connector in a second preferred embodiment according to the invention.
Figure 5B:
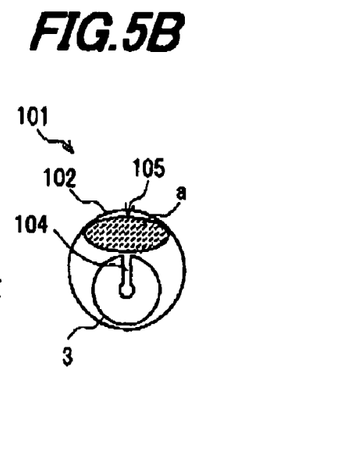
FIG. 5B is a cross sectional view cut along a line 5B-5B in FIG. 5A.

FIG. 5A is a cross sectional view showing an optical connector in the second embodiment of the invention. FIG. 5B is a cross sectional view cut along a line 5B-5B in FIG. 5A.

As shown in FIGS. 5A and 5B, the optical connector 101 of the embodiment is constructed of a protection sleeve 102, a cable insertion tube 3 for butting optical fiber cables 31a and 31b therein by inserting end faces, which are formed only by cutting, of the optical fiber cables 31a and 31b or end faces thereof (without being polished) formed by removing the covering layer 35 at the end of the optical fiber cables 31a and 31b, then cleaning the optical fiber cores and cutting them by an ordinary tool such as scissors or nipper (without using a special tool such as a fiber cutter), and an optical instantaneous (or quick-setting) adhesive material 'a' provided in the protection sleeve 102.

The protection sleeve 102 is composed of a compliant or elastic tubular member formed of an elastic material such as rubber or resin. The protection sleeve 102 has desirably an inside diameter slightly greater than the outer diameter of the cable insertion tube 3 before it encloses the cable insertion tube 3 and an adhesive material bag 105 therein.

The end faces formed only by cutting of the optical fiber cables 31a and 31b mean those that are formed by directly cutting the end of the optical fiber cables 31a, 31b to be connected by using the ordinary tool such as scissors or nipper (i.e., without using a special tool such as a fiber cutter) without removing the covering layer 35 as shown in FIG. 3. The end faces are not polished.

The cable insertion tube 3 is a hard tubular member which has a typical cylindrical shape in appearance. The inside wall is formed tapered such that a large diameter φ b is provided at both ends of the tube for inserting the optical fiber cables 31a, 31b and a small diameter φ s (φb>φ s) is provided at the central part of the tube for suiting the outside diameter Φ of the optical fiber cables 31a, 31b. In this embodiment, the small diameter φ s is rendered a little larger than 250 µm such that the small diameter φ s is slightly larger than the outside diameter Φ.

The cable insertion tube 3 is formed with a metal tube of a metal such as SUS (i.e., stainless steel), Al and Cu with relatively high strength and high thermal conductivity or formed with a glass tube of industrial glass, silica glass etc. In this embodiment, a SUS tube is used that is balanced on the aspect of high strength, high thermal conductivity, low cost and availability.

The cable insertion tube 3 is provided with at least one adhesive material supply hole 104 that penetrates radially from a periphery at a central part in the longitudinal direction to an inner wall of the tube for supplying the optical instantaneous adhesive material 'a' to the central part of the cable insertion tube 3.

In this embodiment, one adhesive material supply hole 104 is formed on the side of the optical instantaneous adhesive material 'a' disposed at the central part of the cable insertion tube 3 such that it has a width (in the longitudinal direction of the tube) longer than the distance Lj of a gap defined between the uneven end faces of the optical fiber cables 31a, 31b. The adhesive material bag 105 with a length a little smaller than the length L of the protection sleeve 102 is disposed covering the upper end of the adhesive material supply hole 104.

The cable insertion tube 3 needs to be accurately shaped since the outer diameter Φ of the optical fiber cables 31a, 31b is very small. Therefore, the cable insertion tube 3 may be formed into a desired shape by shaping a tubular material by cutting work or electrical discharge machining.

The optical instantaneous adhesive material 'a' is a liquid or jelly resin at room temperature. It is cured due to a reaction (polymerization or cross-linking) additionally generated at a part unreacted formerly by absorbing a moisture in the air, irradiating it with UV rays, reacting a base compound with a curing agent added thereto, or mixing the base compound with the curing agent formerly separated from the base compound.

The optical instantaneous adhesive material 'a' is filled in the adhesive material bag 105 formed of a thin balloon etc. and the adhesive material bag 105 is enclosed in the protection sleeve 102. The adhesive material bag 105 is formed such that it can be split or broken by applying a relatively small pressure thereto, e.g., by pressing it with a finger 'a' (See FIG. 5A).

After curing, the optical instantaneous adhesive material 'a' can have a refractive index 'nr' (with n=about 1.463 in this embodiment) that is the same as the core 32 in FIG. 3. Of optical instantaneous adhesive materials with the same after-curing refractive index as the core 32 in FIG. 3, a desired one has a high transmittance (e.g., a transmittance of about 90 to 99% to light of 1.3 µm or 1.55 µm wavelength) to light to be transmitted through the optical fiber 34 and can be adjusted in refractive index by additives.

For example, the optical instantaneous adhesive material 'a' is preferably cyanoacrylate room-temperature curing instantaneous adhesives, light curing instantaneous adhesives, or one or two-component epoxy resin room-temperature curing instantaneous adhesives. In this embodiment, the cyanoacrylate room-temperature curing instantaneous adhesives are used as the optical instantaneous adhesive material 'a'. The cyanoacrylate room-temperature curing instantaneous adhesives include cyanoacrylate as a major component and act to be cured at room temperature by absorbing moisture in the air.

The light curing instantaneous adhesives act to be instantaneously cured at a site to which it penetrates through an applied body and also to be cured due to light-anion polymerization by irradiating it with light (UV or visible light). The light curing instantaneous adhesives are provided with merits of both of instantaneous adhesives and light curing resins.

The one-component epoxy resin room-temperature curing instantaneous adhesives act to be cured at room temperature by reacting an epoxy resin as a base compound with a curing agent such as polyamines added thereto. On the other hand, the two-component epoxy resin room-temperature curing instantaneous adhesives act to be cured at room temperature by mixing a base compound (component A) with a curing agent (component B) formerly separated therefrom.

In case of using the two-component epoxy resin room-temperature curing instantaneous adhesives as the optical instantaneous adhesive material 'a', the adhesive material bag 105 is composed of two divided bags, i.e., a base compound bag with the base compound filled therein and a curing agent bag with the curing agent filled therein. In this case, the adhesive material bag 105 is designed such that the base compound bag and the curing agent bag can be simultaneously split or broken by applying a relatively low pressure thereto.

The length L of the optical connector 101 (or protection sleeve 102) is rendered 2 to 10 cm, preferably 3 to 8 cm, more preferably 3 to 6 cm in consideration of the strength of the connection part of the optical fiber cable or the downsizing of the optical connector. The cable insertion tube 3 is preferably shorter than the length L of the protection sleeve 102.

A method for connecting the optical fiber cables 31a, 31b each other by using the optical connector 101 will be explained below.

First, as shown in FIGS. 5A and 5B, the optical connector 101 is provided. For example, the optical connector 101 is assembled such that the cable insertion tube 3 is enclosed in the protection sleeve 102 and the adhesive material bag 105 is enclosed in the protection sleeve 102 while expanding the inside diameter of the protection sleeve 102.

Then, the end of the two optical fiber cables 31a, 31b to be connected is cut by the ordinary cutter such that the core, the cladding and the covering layer are cut together, or the covering layer 35 at the end of the cables is removed and cleaned and the exposed core and the cladding are cut by the ordinary tool such as scissors or nipper.

Then, the end faces of the optical fiber cables 31a, 31b formed by cutting as above are each inserted into both sides of the cable insertion tube 3 in the protection sleeve 102 and butted at the central part of the cable insertion tube 3. When the end faces of the optical fiber cables 31a, 31b are butted each other, the butting distance (i.e., the gap between the end faces of the optical fiber cables 31a, 31b) Lj is tens of micrometers at a maximum.

Figure 6A:
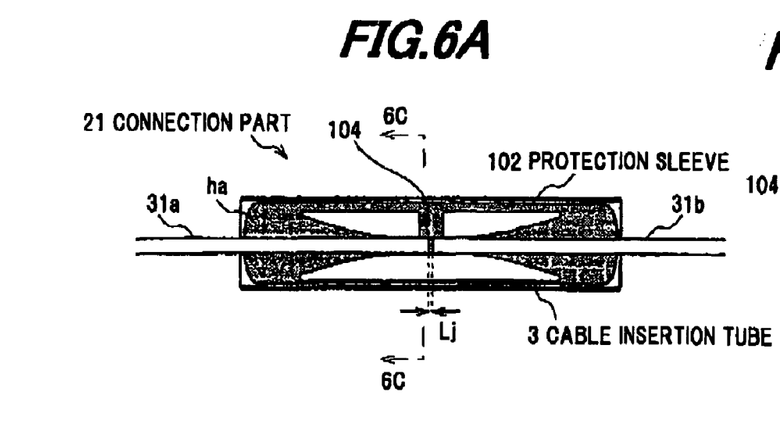
FIG. 6A is a cross sectional view showing an optical connector (connection part of optical fiber cores) with optical fiber cores connected each other therein.
Figure 6B:
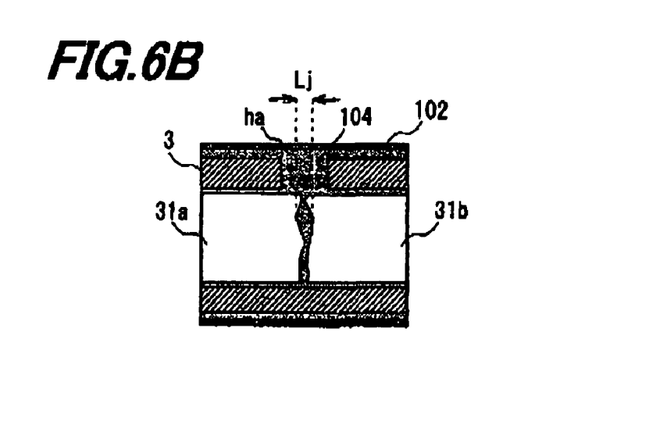
FIG. 6B is an enlarged cross sectional view showing a central part of the optical connector in FIG. 6A.
Figure 6C:
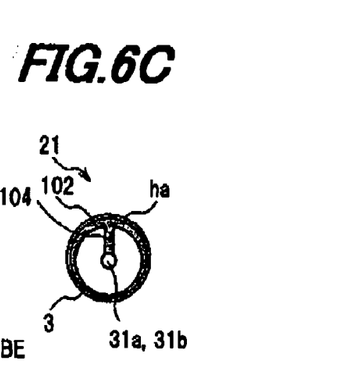
FIG. 6C is a cross sectional view cut along a line 6C-6C in FIG. 6A.

Then, the adhesive material bag 105 is split or broken by applying a relatively low pressure with, e.g., a finger 'f' (See FIG. 5A) to the outside of the protection sleeve 102. At this moment, as shown in FIGS. 6A to 6C, the optical instantaneous adhesive material 'a' in the adhesive material bag 105 as shown in FIGS. 5A and 5B penetrates through the adhesive material supply hole 104 of the cable insertion tube 3 into the inside of the cable insertion tube 3 to fill the gap between the end faces of the optical fiber cables 31a, 31b as well as the adhesive material supply hole 104.

Finally, due to the cable insertion tube 3 shorter than the protection sleeve 102, the optical instantaneous adhesive material 'a' also flows around to both ends of the cable insertion tube 3, so that almost all of the inside spaces of the protection sleeve 102 are filled with the optical instantaneous adhesive material 'a'.

Hereupon, the optical instantaneous adhesive material 'a' is instantaneously cured and forms an adhesion portion 'ha' with the same refractive index as the core 32 in FIG. 3. Thereby, a connection part 21 of the optical fiber cables 31a, 31b can be obtained in which the adhesion portion 'ha' and the cores of the optical fiber cables 31a, 31b are matched (or optically coupled) and fixed to each other.

Effects of the Second Embodiment

The effects of the second embodiment will be described below.

The optical connector 101 is formed such that the cable insertion tube 3 is disposed within the protection sleeve 102, the cable insertion tube 3 is provided with the adhesive material supply hole 104 formed therein, and the optical instantaneous adhesive material 'a' is disposed in protection sleeve 102. Thus, it can be formed in simple composition and the number of components thereof can be reduced.

The connecting method of the two optical fiber cables 31a, 31b by using the optical connector 101 can be simply conducted such that the end of the cables is cut by the ordinary cutting tool such as scissors, the cut end faces are inserted into the cable insertion tube 3 and butted therein, and the relatively low pressure is applied with, e.g., a finger 'f' (See FIG. 5A) to the outside of the protection sleeve 102.

Thereby, the optical instantaneous adhesive material 'a' is naturally flown out from the split adhesive material bag 105, and it penetrates through the adhesive material supply hole 104 into the butting part and is then instantaneously cured. Thus, the end faces of the optical fiber cables 31a, 31b can be easily optically coupled and connected each other.

In other words, the optical connector 101 does not need the fiber cutting by the fiber cutter and the end face polishing at the connection part of the optical fiber cables 31a, 31b. Everyone can easy connect the optical fibers 34 as if done in electrical cable connection. Therefore, the optical connector 101 can be also called a simple optical connector.

In the optical connector 101, the adhesive material bag 105 with the optical instantaneous adhesive material 'a' filled therein is enclosed in the protection sleeve 102. Therefore, the optical fiber cables 31a, 31b can be connected each other only by the applying the relatively low pressure with, e.g., a finger 'f' to the outside of the protection sleeve 102.

The cable insertion tube 3 is formed tapered such that the large diameter is provided at both ends of the tube and the small diameter is provided at the central part of the tube for suiting the outside diameter Φ of the optical fiber cables 31a, 31b. Therefore, the optical fiber cables 31a, 31b can be easy inserted into the cable insertion tube 3 of the optical connector 101.

The cable insertion tube 3 can also serve as a support body for the connector itself and for the connection part 21 of the optical fiber cables. Therefore, the optical connector 101 and the connection part 21 of the optical fiber cables can be prevented from folding or bending so that the strength of the optical connector 101 can be enhanced.

The optical instantaneous adhesive material 'a' used in the optical connector 101 can have the same refractive index as the core 32 after curing. Therefore, even when the fiber cut surface is roughened (See FIG. 6B) as the optical fiber cables 31a, 31b are cut by the ordinary tool, the after-curing adhesion portion 'ha' and the cores of the optical fiber cables 31a, 31b can be matched in refractive index. Namely, the after-curing adhesion portion 'ha' can serve as both a refractive index adjuster and an adhesive.

The optical fiber cable 31 as shown in FIG. 3 allows the internal optical fiber 34 to be broken as well as allowing the external covering layer 35 to be broken (or cut away) by bending. Thus, regardless of the existence of the covering layer 35, the optical fiber with the covering layer can be broken (cut away) by folding by hand.

Thus, the optical connector 101 can be also used such that the end faces of the optical fiber cables 31a, 31b formed by breaking (or cutting) by hand can be butted and connected each other in the cable insertion tube 3.

Optionally, plural protrusions for sticking the adhesive material bag 105 according to the relatively low pressure with, e.g., a finger 'f' may be provided on the periphery of the cable insertion tube 3 and in the proximity of the adhesive material supply hole 104.

In the above embodiment, the optical instantaneous adhesive material 'a' filled in the adhesive material bag 105 is in an amount to fill almost all of the spaces (or gaps) in the protection sleeve 102 after curing and forming the adhesion portion 'ha'. However, it may be in an amount a little exceeding almost all of the spaces (or gaps) in the protection sleeve 102 after curing and forming the adhesion portion 'ha'. In this case, the excessive optical instantaneous adhesive material 'a' is flown out from both ends of the protection sleeve 102 after curing and hardened such that the optical fiber cables 31a, 31b can be firmly bonded to the heat shrinkable tube 2 after curing and forming the adhesion portion 'ha'. Thereby, the strength of the connection part of the optical fiber cable can be also enhanced.

In the above embodiment the optical fiber cable 31 uses the covering layer 35 with the two layer structure. However, the optical fiber cable 31 may use a cover layer with a single structure formed of, e.g., a UV curable resin.

The optical fiber composing the optical fiber cable may be a multi-mode optical fiber when the transmission speed is 10 Gbit/s or less or the total length of the optical fiber is 500 m or less.

EXAMPLES

In the connection loss evaluation test system as shown in FIGS. 4A and 4B, the covering layer 35 of the optical fiber cable 31 at a part for butting connection ends is removed. Then, the exposed optical fiber is cut at the part by scissors (FIG. 4A) and the optical fiber cables 31, 31 are connected each other by the optical connector 101 as shown in FIG. 5A to provide the connection part 21 of the optical fiber cables (FIG. 4B).

The optical fiber 34 is an ordinary SMF (single-mode optical fiber), a light source 42 is a stabilized light source LD-MG923A from Anritsu Corporation with a wavelength of 1.55 µm, and an optical power detector 43 is a power meter AQ2140 from Ando Electric Co., Ltd. An SMF (with a length of 4000 m) (not shown) with FC connectors 44 attached at both ends thereof is directly connected between the light source 42 and the optical power detector 43 as a reference for the connection loss evaluation.

The fiber connection via the connection part 21 as above is repeated five times where the optical fiber 34 is cut always by the scissors. As a result, the connection loss is all measured 0.30 dB or less. When temperature is changed between −40° C. and 85° C., the connection loss and the return loss are each nearly constant.

As described, where the optical fiber 34 is cut by scissors and the respective end faces of the two optical fibers 34, 34 are connected each other via the connection part 21 of the optical fiber cables, the connection loss does not matter on the aspect of practical use. It will be appreciated that the optical instantaneous adhesive material used for the optical connector only has to have the same refractive index as the core after curing.

In addition, even when the covering layer 35 is not removed, i.e., even when the end faces of the optical fiber cables 31a, 31b formed only by cutting are butt-connected in the cable insertion tube 3, the same results are obtained in the evaluation test as described above.

Thus, in connecting the optical fiber 34, the invention does not need cutting work using a specialized tool such as a fiber cutter, polishing work etc. and therefore it can save time, cost and steps. In addition, every worker can easy conduct the connection work by using the optical connector of the invention.

The invention can apply not only to the optical fiber connection for communications but also to the optical fiber connection for various industrial products such as an industrial robot where optical fibers are difficult to use in terms of the conventional optical fiber connection technique since it has many components and connection points. Thus, also in the industrial products, the optical fiber can be easy connected without additional steps.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical connector for optically coupling respective end faces of two optical fiber cables comprising an optical fiber comprising a core and a cladding, comprising:
   a heat shrinkable tube;
   a cable insertion tube disposed in the heat shrinkable tube for inserting thereinto and butting the respective end faces of the two optical fiber cables;
   an uncured refractive index matching resin disposed between the heat shrinkable tube and the cable insertion tube; and
   a resin supply hole formed in the cable insertion tube for supplying the uncured refractive index matching resin to an inside of the cable insertion tube.

2. The optical connector according to claim 1, further comprising:
   a resin bag with the uncured refractive index matching resin filled therein or a resin tube formed of the uncured refractive index matching resin.

3. The optical connector according to claim 1, wherein the cable insertion tube is formed tapered such that it has a large diameter at both ends thereof for inserting the optical fiber cables, and a small diameter at a central region according to an outside diameter of the optical fiber cables.

4. The optical connector according to claim 1, wherein the cable insertion tube comprises a metal tube or a glass tube.

5. The optical connector according to claim 1, wherein the refractive index matching resin has nearly a same refractive index as the core after curing.

6. The optical connector according to claim 1, wherein the refractive index matching resin comprises a heat curable resin or a ultraviolet curable resin.

7. An optical connector for optically coupling respective end faces of two optical fiber cables comprising an optical fiber comprising a core and a cladding, comprising:

a protection sleeve;

a cable insertion tube disposed in the protection sleeve for inserting thereinto and butting the respective end faces of the two optical fiber cables;

an optical instantaneous adhesive material disposed between the protection sleeve and the cable insertion tube; and an adhesive material supply hole formed in the cable insertion tube for supplying the optical instantaneous adhesive material to an inside of the cable insertion tube; and an adhesive material bag with the optical instantaneous adhesive material filled therein.

8. The optical connector according to claim 7, wherein the cable insertion tube is formed tapered such that it has a large diameter at both ends thereof for inserting the optical fiber cables, and a small diameter at a central region according to an outside diameter of the optical fiber cables.

9. The optical connector according to claim 7, wherein the cable insertion tube comprises a metal tube or a glass tube.

10. The optical connector according to claim 7, wherein the optical instantaneous adhesive material has nearly a same refractive index as the core after curing.

11. The optical connector according to claim 7, wherein the optical instantaneous adhesive material comprises cyanoacrylate room-temperature curing instantaneous adhesives, light curing instantaneous adhesives, or one or two-component epoxy resin room-temperature curing instantaneous adhesives.

* * * * *